No. 780,535. PATENTED JAN. 24, 1905.
H. A. STEBER.
CONDENSER.
APPLICATION FILED OCT. 6, 1903.

2 SHEETS—SHEET 1.

Witnesses
Inventor
Henry A. Steber
By Mason Fenwick & Lawrence
Attorneys

No. 780,535. PATENTED JAN. 24, 1905.
H. A. STEBER.
CONDENSER.
APPLICATION FILED OCT. 6, 1903.

2 SHEETS—SHEET 2.

Witnesses
Inventor
Henry A. Steber
By
Mason Fenwick & Lawrence
Attorneys

No. 780,535. Patented January 24, 1905.

UNITED STATES PATENT OFFICE.

HENRY A. STEBER, OF UTICA, NEW YORK.

CONDENSER.

SPECIFICATION forming part of Letters Patent No. 780,535, dated January 24, 1905.

Application filed October 6, 1903. Serial No. 175,960.

*To all whom it may concern:*

Be it known that I, HENRY A. STEBER, a citizen of the United States, residing at Utica, in the county of Oneida and State of New York, have invented certain new and useful Improvements in Condensers; and I do hereby declare the following to be a full, clear, and exact description of the invention, such as will enable others skilled in the art to which it appertains to make and use the same.

This invention relates to improvements in condensers; and the object in view is to provide a condenser with an inner and an outer cooling chamber or casing.

Another object of the invention is to provide means connected with said inner and outer casing for controlling the supply of cooling liquids thereto.

A further object of the invention is to provide an inner cooling-casing with a roughened or bulged surface.

With these and further objects in view the invention consists in certain novel constructions, combinations, and arrangements of parts, as will be hereinafter fully described and claimed.

Figure 1:
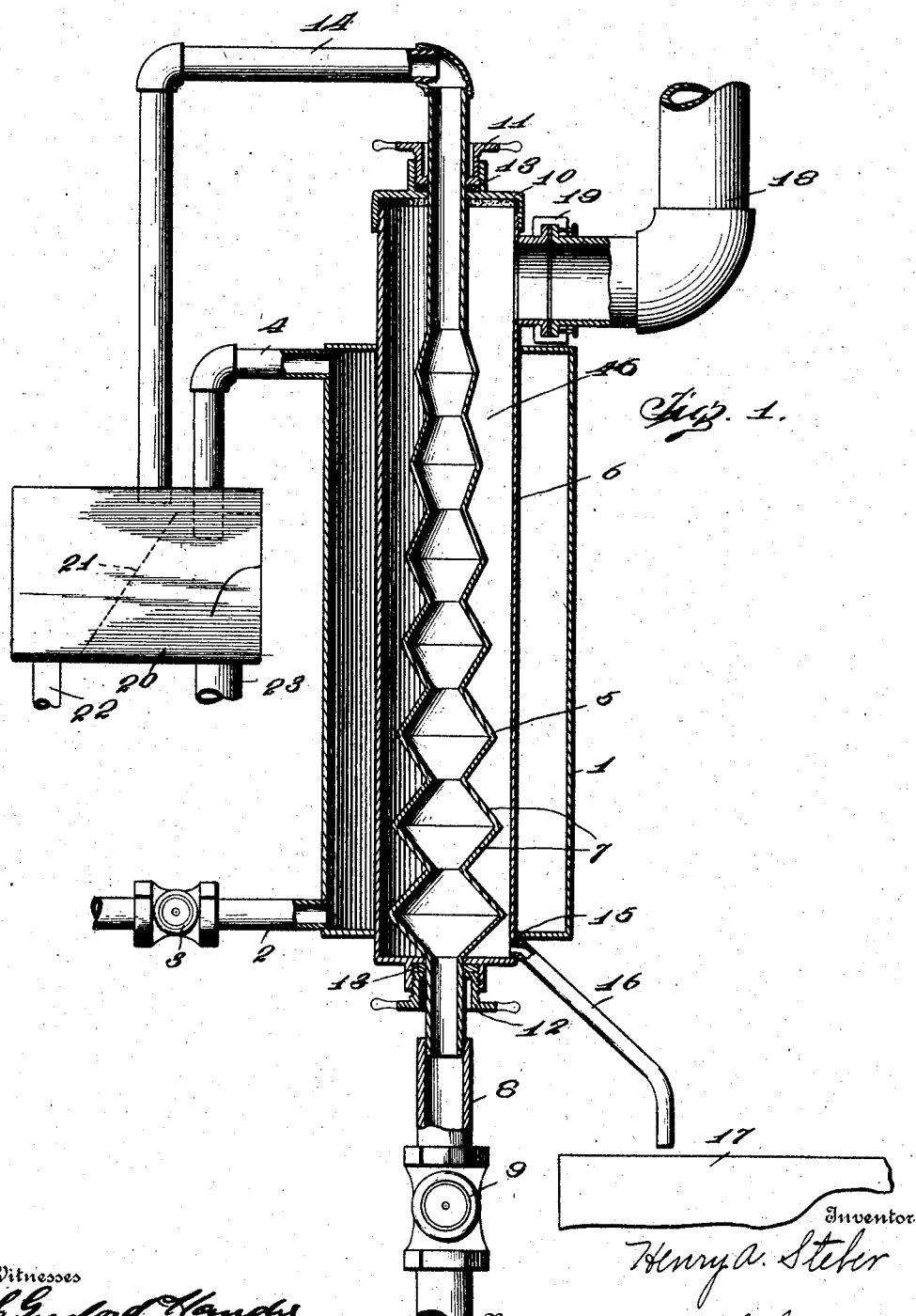
Figure 2:
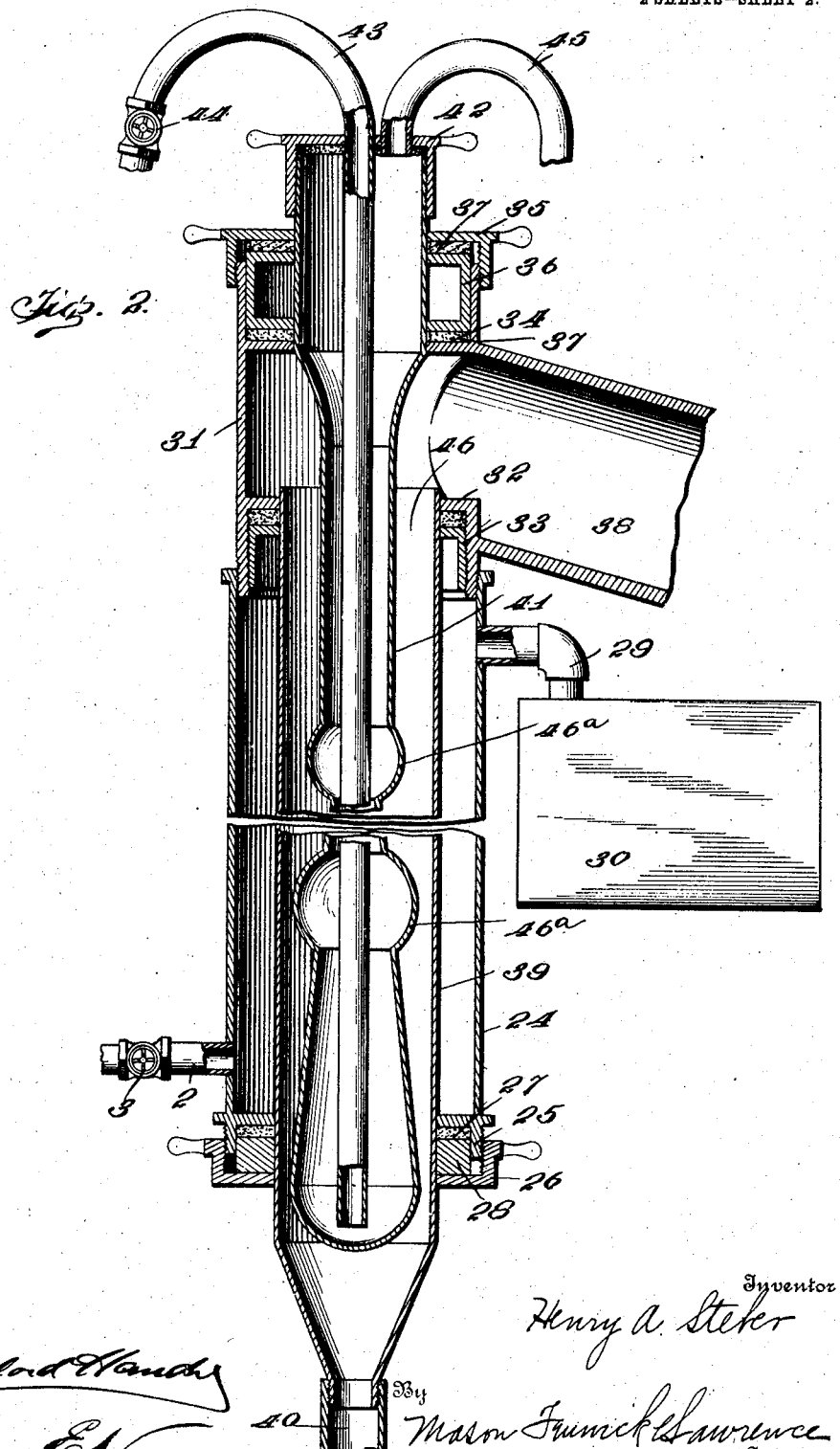

In the accompanying drawings, Figure 1 represents a side view of my invention, showing parts thereof in section. Fig. 2 represents another embodiment of my invention, showing parts in vertical section.

Referring to the drawings by reference-numerals, 1 designates a cylindrical outer casing which is provided with a supply-pipe 2 in communication therewith. Upon said supply-pipe 2 a suitable valve 3 is mounted. A discharge-pipe 4 is attached to said casing 1 near its upper end. The inner cooling-casing 5 is detachably secured within a cylindrical casing 6, said casing 6 being removably mounted within the outer casing 1. The inner casing 5 is preferably formed with a plurality of corrugations 7. Said corrugations are of less diameter toward the top. Near the bottom of casing 5 is a supply-pipe 8, which communicates with said casing, and by means of the valve 9, mounted thereon, the flow of cooling liquid is controlled. A removable cap 10 is secured upon casing 6 and is provided with a suitable stuffing-box 11. At the opposite end of said casing 6 is also mounted a duplicate stuffing-box 12. By means of these stuffing-boxes the inner cooling-chamber 5 is securely attached to the casing 6. The said casing 5 is provided with a removable discharge-pipe 14. Detachably secured upon the casing 6 at 15 is a removable pipe 16, which is adapted to conduct the condensed liquids to a suitable receptacle 17. The vapors from a boiler are conducted, by means of a pipe 18, which is detachably secured to casing 6 by clamps 19, to the vapor-space formed between casings 6 and 5.

In constructing this invention I also provide a suitable discharge-receptacle 20, which is provided with an inclined partition 21. An outlet-pipe 22 is secured to said receptacle 20 and communicates with one of the partitioned compartments. The pipe 22 is adapted to communicate with the boiler, and thereby provide means for conducting part of the discharged liquids to said boiler for the utilization of the same. Another pipe, 23, is secured to said discharge-receptacle 22 and is preferably formed of greater diameter than the discharge-pipe 22. By this construction it will be apparent that a greater volume of liquids may be passed through said pipe 23 than through pipe 22, said pipe 23 communicating with any suitable waste-receptacle. By means of valves 3 and 9 the discharge of the cooling liquids to said discharge-receptacle 20 is controlled. If the liquids contained in the partitioned portion of the receptacle 20, which is in communication with discharge-pipe 22, are not removed from the said partitioned portion, the liquids therein may overflow into the portion of the receptacle in communication with pipe 23.

In Fig. 2, 24 designates a sectional outer casing, which is provided with an inlet-pipe 2, a valve 3 being mounted upon said pipe. The outer casing 24 is provided at its lower portion with a screw-threaded annular sleeve 25. Upon said sleeve is detachably secured an annular locking-sleeve 26. Within said sleeve and said annular extension 25 is removably mounted a suitable packing 27. Engaging this packing and removably mounted within the members 25 and 26 is also an annular ring 28, which is adapted to normally press against the packing 27 and produce a certain function in constructing the invention, as will be hereinafter described. Secured to said casing 24 is a suitable discharge-pipe 29, which communicates with a discharge-receptacle 30. The upper portion of said casing 24 is provided with a removable cap or member 31, said member being detachably secured by suitable means within the primary portion of the casing 24. A dividing-wall 32 is formed integral with said member 31, and by means thereof and a removable annular member 33 a suitable packing is detachably secured within said casing 24. Formed integral with said member 31 of the casing 24 is a duplicate partition 34, which is secured in a parallel position with the partition 32. A removable cap or member 35 is secured upon the outer ends of the member 31 of the casing 24. Within a compartment formed by means of the partition 34 and the cap 35 an annular hollow casing 36 is detachably secured. Between the cap 35 and the partition 34 is a pair of removable packings 37. Formed integral with the member 31 is a casing 38, which is adapted to conduct the vapors from a suitable boiler to the condenser. Removably mounted within said sectional outer casing 24 is a cylindrical casing 39. Said casing 39 is provided with a funnel-shaped lower portion, which communicates with a conducting-pipe 40 for carrying the condensed vapors to a suitable receiving-receptacle.

It will be obvious that the casing 39, forming the inner wall of the outer cooling-receptacle and the outer wall of the vaporizing-chamber, is detachably secured in a fixed position by means of the packing 27 retained within the casing 24, and also the packing retained, by means of the removable collar 33, within the lower portion of the part 31, which is detachably secured to the outer casing 24. Removably mounted within the casing 39 by means of the packing and the clamping members therefor is an inner receptacle 41. This receptacle 41, as well as casing 39, is formed from any suitable non-corrodible material, such as glass, and is provided with a removable cap 42. Upon this cap 42 is detachably secured a supply-pipe 43, which extends within said receptacle 41 and terminates near the bottom thereof. Said supply-pipe 43 is provided with a valve 44, which controls the flow of the supply of cooling liquids to the inner receptacle 41. A suitable discharge-pipe 45 is also attached to said cap 42 and communicates with any suitable discharge-receptacle. In this embodiment of the invention I preferably form the inner cooling-receptacle 41 with a plurality of bulging portions $46^n$. In this embodiment the cooling liquids are passed through the supply-pipe 43 and are discharged near the bottom of the inner casing 41, passing upward and out through the pipe 45.

The vapors are supplied by means of the conducting-pipes 18 and 38 to the condensing-chambers or vapor-spaces 46, and owing to the peculiar construction of the inner cooling-casing the vapors will come in contact with the outer surface of said casing, and before they pass out through the conducting-pipes 8 and 40 they will be condensed. The diameter of the lower portion of the inner cooling-casing is of such extent that the lower portion thereof terminates near the walls of the casing forming the inner part of the outer cooling-chamber.

Having thus fully described my invention, what I claim as new, and desire to secure by Letters Patent, is—

1. A condenser, comprising a condensing-chamber, an imperforate cooling-casing provided with a plurality of bulging portions of non-corrodible material passing through the same from end to end of greater diameter at one end than at its opposite end, and an outer cooling-casing mounted upon and surrounding a portion of the condensing-chamber.

2. A condenser, comprising a condensing-casing of the same diameter throughout its length, an inner cooling-casing with imperforate shell of non-corrodible material extending throughout the condensing-chamber from end to end and increasing in size from one end to its opposite end, and an outer cooling-casing of the same diameter throughout its length mounted upon and inclosing a portion of the condensing-casing.

3. A condenser, comprising a casing of the same diameter throughout its length for receiving the vapors to be condensed, an inner cooling-casing with imperforate shell extending through the condensing-casing and increasing in diameter throughout its entire length toward the discharge end of the condensing-casing, and an outer cooling-chamber of approximately the same diameter throughout its entire length surrounding the greater portion of the condensing-casing.

4. In a device of the character described, the combination of inner and outer cooling-receptacles arranged one within the other, a discharge-receptacle provided with compartments, piping connecting each of said cooling-receptacles with a compartment of the discharge-receptacle, and a valved inlet, communicating with each of said cooling-receptacles for controlling the supply of liquids to the same.

5. In a device of the character described, the combination of an inner and an outer cooling-casing, means for governing the supply of liquids thereto, and a partitioned discharge-receptacle assembled with said condenser and adapted to receive the liquids discharged therefrom.

6. In a device of the character described, the combination of a plurality of receptacles, a partitioned discharge-receptacle assembled therewith, and means secured to said receptacles providing separate communicating means with said discharge-receptacle.

7. A condenser, comprising a condensing-receptacle of the same diameter throughout its length, a cooling-tube formed of varying dimensions at different points extending through the condensing-receptacle, the said cooling-tube filling the greater portion of the internal area of said condensing-receptacle at one end than at the other, and a cooling-jacket partly inclosing the condensing-receptacle.

8. In a device of the character described, the combination of an outer casing, an inner casing detachably secured thereto, a discharge-receptacle assembled with said casings comprising a receptacle, a partition secured within said receptacle in an inclined position, and means independently controlling the supply of cooling liquids to said casings and the discharge-receiving receptacle.

9. A condenser, comprising an inner receptacle formed with a plurality of communicating compartments increasing in diameter toward one end thereof, an outer receptacle of the same diameter throughout its length assembled upon said inner receptacle and partially surrounding the same, and means for supplying the liquids and vapors independently to said condenser.

10. A condenser comprising a condensing-casing of the same diameter from end to end, a cooling-casing passing through the condensing-casing and formed of varying diameters at different points and an inclosing and cooling jacket outside the condensing-casing.

11. In a device of the character described, the combination of a sectional, outer casing provided with a removable member at its upper end, said member being provided with duplicate means for securing a casing forming the inner walls of the outer receptacle within said outer casing, and a removable, auxiliary inner casing mounted within said outer casing.

12. In a device of the character described, the combination of an outer casing comprising a primary section, a removable member secured thereto, said member provided with a plurality of packings, a removable, inner casing secured within said outer casing by means of said packings, said inner casing formed of non-corrodible material and provided with a plurality of bulging portions, and means assembled with said casings for supplying vapors and cooling liquids independently thereto.

13. A condenser comprising a condensing-cylinder of the same diameter from end to end, an inner cooling-tube passing longitudinally through said casing and increasing in diameter from the inlet toward the outlet end of the condensing-casing, an outer inclosing cooling-jacket surrounding a portion of the condensing-casing and means for independently supplying cooling liquids to the inner tube and the outer jacket.

14. A condenser comprising a condensing-chamber of the same diameter from end to end, an inner cooling-tube extending from one end of the casing to the other interiorly thereof and formed with a succession of enlarged or bulged portions of progressively-greater diameters, means for introducing a cooling liquid into said bulged portions, and means for applying cooling liquids to the outer surface of the condensing-casing.

15. A condenser, comprising an inner cooling-casing, a condensing-casing provided with removable, locking means mounted upon each of its ends for securing the same in an assembled position upon said inner cooling-casing, an outer cooling-casing mounted upon said casing, separate means for introducing liquids into said cooling-casings near their lowest ends, and means for discharging said liquids near the upper end of said casings.

16. A condenser, comprising an inner cooling-receptacle having a plurality of bulging portions, a condensing-casing of less length than and assembled upon said inner receptacle, and an outer cooling-casing of less length than and assembled upon said condensing-casing.

17. A condenser, comprising an inner cooling-receptacle, a condensing-casing assembled upon said cooling-receptacle, removable fastening means secured upon the ends of said condensing-casing and engaging said cooling-receptacle, and an outer cooling-receptacle assembled with said condensing-casing.

18. A condenser, comprising an inner roughened cooling-receptacle, a removable condensing-casing of less length than and mounted upon said cooling-receptacle, and a removable outer cooling-casing of less length than and mounted upon said condensing-casing.

19. A condenser, comprising an inner cooling-receptacle of varying diameters throughout its length, a condensing-casing removably mounted upon said inner receptacle, and a removable, sealed outer receptacle of less length than said condensing-casing mounted thereon.

20. A condenser, comprising a plurality of cylindrical casings, one of said casings provided with a removable cap mounted upon one end, locking means mounted upon said cap and upon the opposite end of said casing, said locking means adapted to engage and retain one of said casings in an assembled position with said casing provided with the cap, and means for introducing liquids to said casings and permitting of the discharge of said liquids therefrom.

21. In a device of the character described, the combination of a series of casings retained in an assembled position, a central casing of greater length than the remaining casings, a discharge-receptacle assembled with said casings, communicating means assembled with the inner and outer casings near the top portion thereof and with said discharge-receptacle, and means for supplying vapors and liquids to said casings.

22. A device of the character described, comprising a condensing-casing provided with locking means mounted upon its ends, a cooling-casing removably secured within said condensing-casing by means of said locking means, an outer cooling-casing mounted upon said condensing-casing partly surrounding the same, inlet means communicating with each casing near the top thereof, an outlet means communicating with each casing near the bottom thereof.

In testimony whereof I hereunto affix my signature in presence of two witnesses.

HENRY A. STEBER.

Witnesses:
M. A. SACHER,
JOHN WELCH.